US012681440B2

(12) United States Patent
Trojanek

(10) Patent No.: US 12,681,440 B2
(45) Date of Patent: Jul. 14, 2026

(54) DEVICE FOR ACCURATE MEASUREMENT OF TIME INTERVALS

(71) Applicant: TROJÁNEK, ING., Pavel, Prague (CZ)

(72) Inventor: Pavel Trojanek, Prague (CZ)

(*) Notice: Subject to any disclaimer, the term of this patent is extended or adjusted under 35 U.S.C. 154(b) by 636 days.

(21) Appl. No.: 17/756,804

(22) PCT Filed: Dec. 7, 2020

(86) PCT No.: PCT/CZ2020/050092
§ 371 (c)(1),
(2) Date: Jun. 2, 2022

(87) PCT Pub. No.: WO2021/115500
PCT Pub. Date: Jun. 17, 2021

(65) Prior Publication Data
US 2023/0012142 A1 Jan. 12, 2023

(30) Foreign Application Priority Data
Dec. 18, 2019 (CZ) ................................ CZ2019-751

(51) Int. Cl.
*G04F 10/04* (2006.01)
*G04F 10/00* (2006.01)
*G04F 10/06* (2006.01)

(52) U.S. Cl.
CPC ............ *G04F 10/04* (2013.01); *G04F 10/005* (2013.01); *G04F 10/06* (2013.01)

(58) Field of Classification Search
None
See application file for complete search history.

(56) References Cited

U.S. PATENT DOCUMENTS 4,000,466 A * 12/1976 Scouten .................. G04F 10/00 327/12
7,619,405 B2 * 11/2009 Steinich ................. G01D 5/485 324/207.13

FOREIGN PATENT DOCUMENTS

| | | | |
|---|---|---|---|
| CN | 105629705 | A | 6/2016 |
| CZ | 287073 | B6 | 7/1995 |
| CZ | 20032393 | A3 | 11/2004 |
| WO | 2019185658 | A1 | 10/2019 |

OTHER PUBLICATIONS

ISR; Visegrad Patent Institute; Apr. 14, 2021.

* cited by examiner

*Primary Examiner* — Cassandra F Cox
(74) *Attorney, Agent, or Firm* — Patshegen IP; Moshe Pinchas

(57) ABSTRACT

The device for accurate measurement of time intervals comprises a first comparator (1) to the input of which a first signal (STA) is fed and the output of which is connected to the first of the inputs of the combiner (3), to the second input of which the output of a second comparator (2) is connected, to the input of which a second signal (STO) is fed. The output of the combiner (3) is connected to the input of an analogue filter (4), the output of which is connected to the input of an analogue-to-digital converter (5), the output of which is connected to the input of a control and signal processing circuit (6), to the second input of which a reference clock signal (REF) is further fed, which is simultaneously fed to another input of the analogue-to-digital converter (5) and the output of the control and signal processing circuit (6) is a data output (DAT) of time intervals.

12 Claims, 11 Drawing Sheets

[Fig. 1]
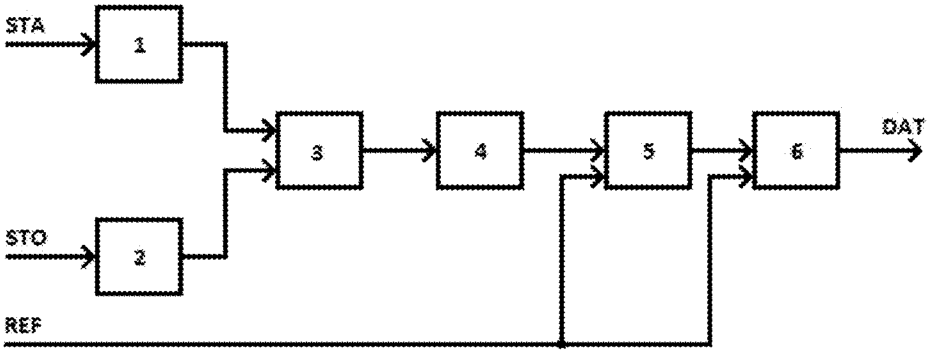
[Fig. 2]
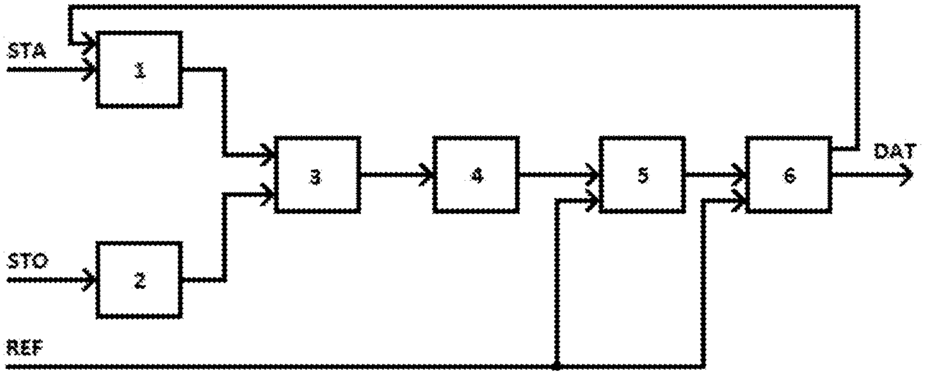
[Fig. 3]
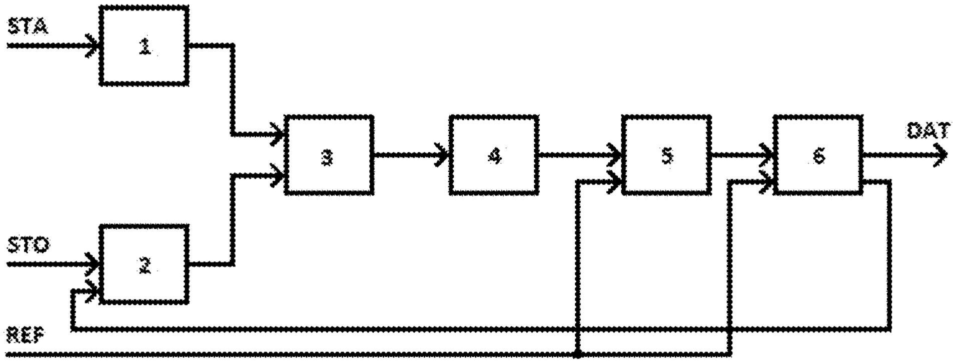

[Fig. 4]
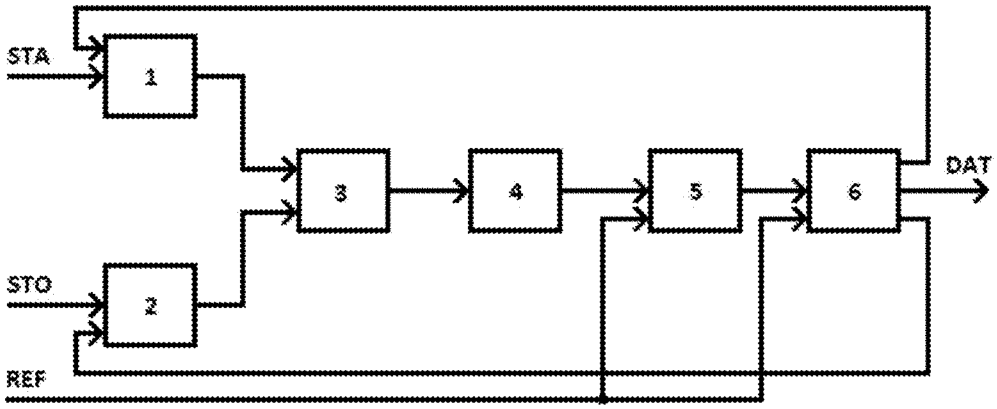
[Fig. 5]
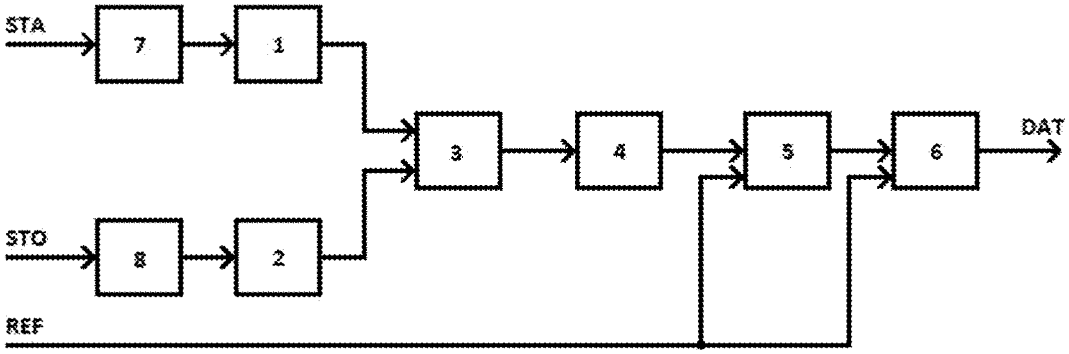
[Fig. 6]
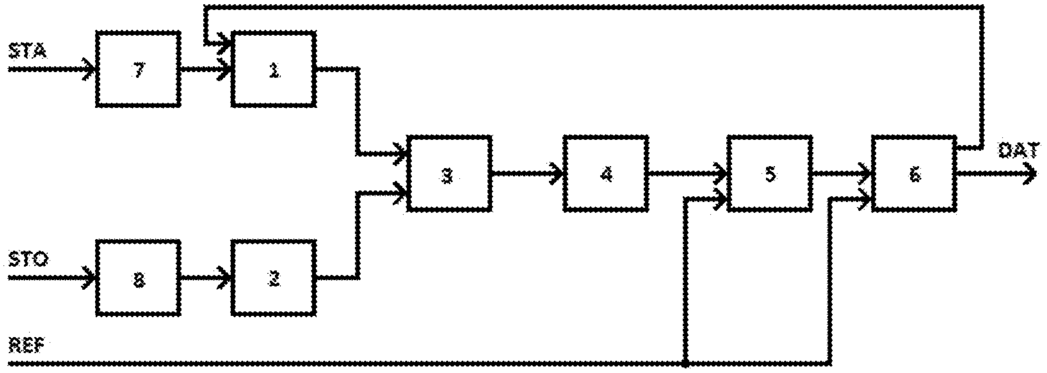

[Fig. 7]
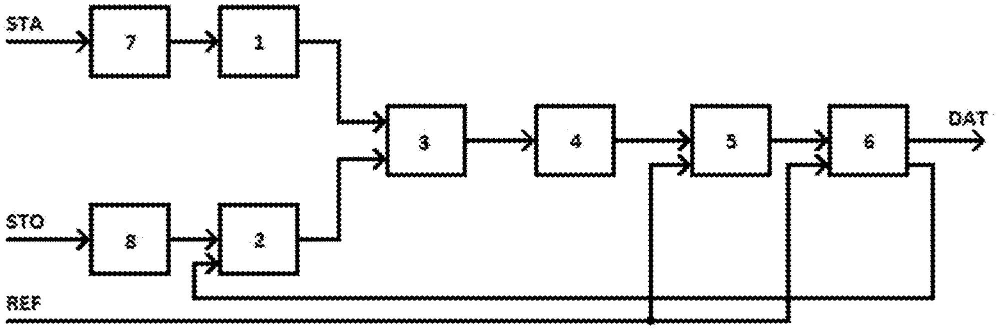
[Fig. 8]
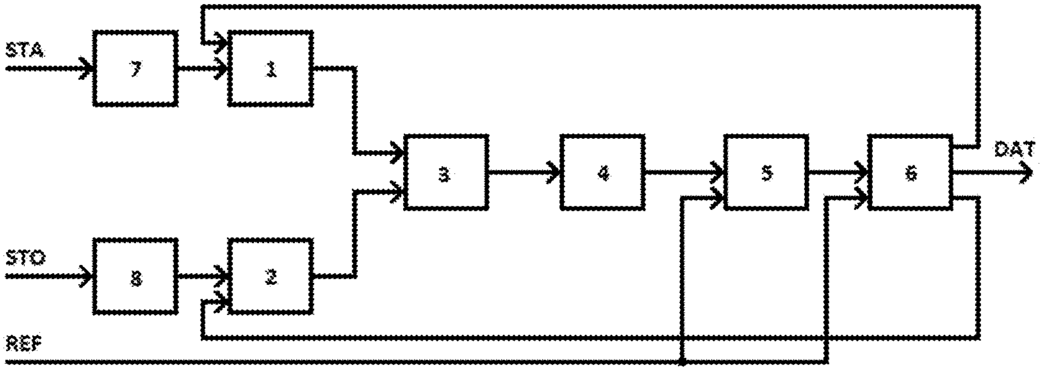
[Fig. 9]
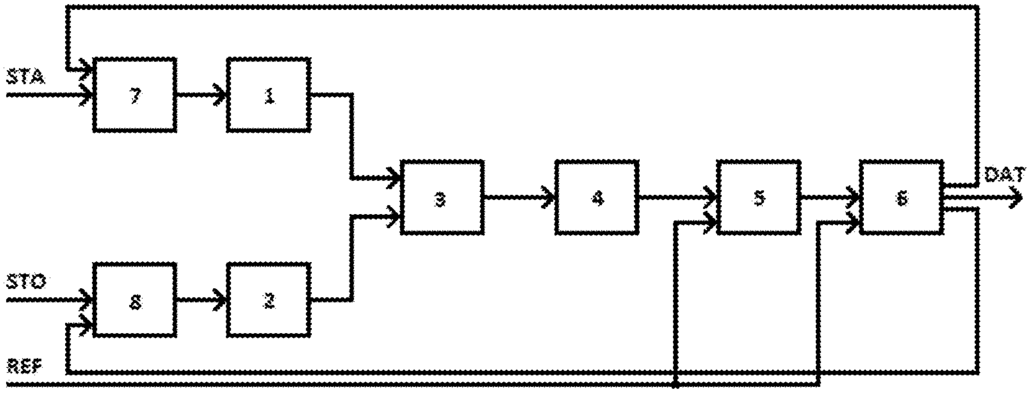

[Fig. 10]
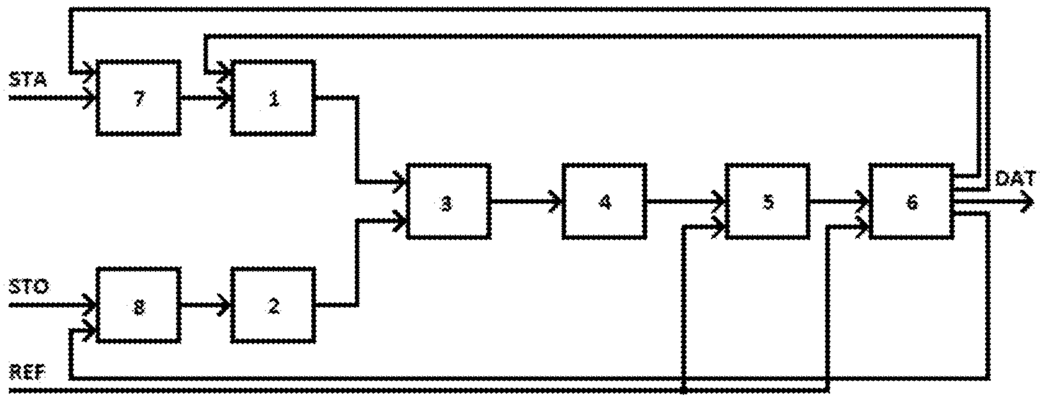
[Fig. 11]
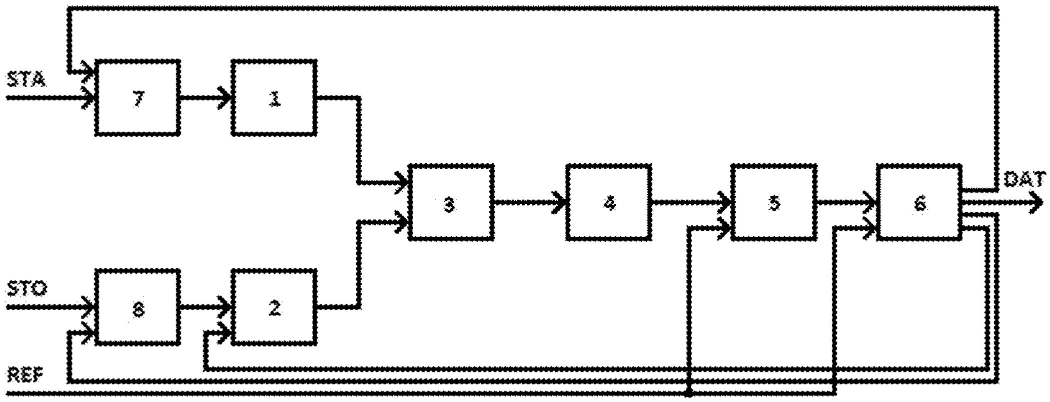
[Fig. 12]
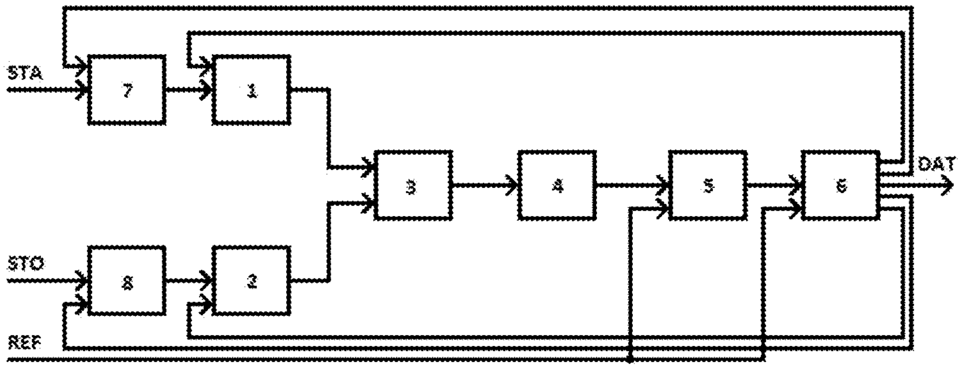

[Fig. 13]
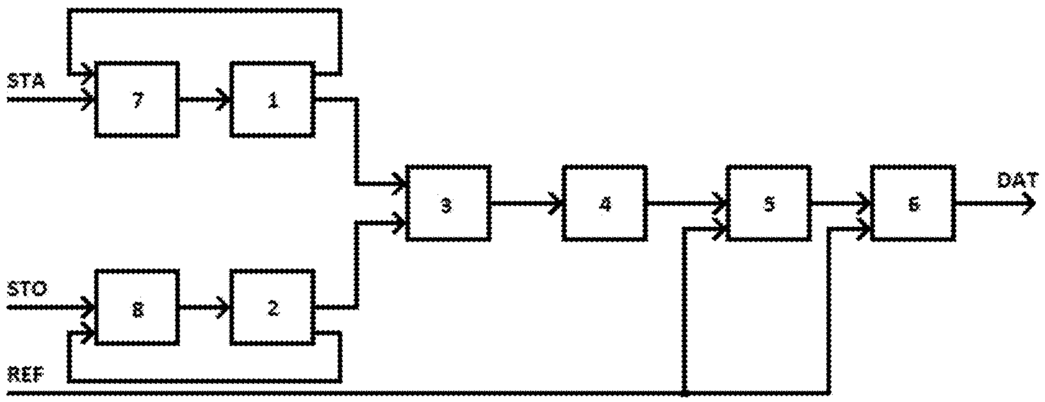
[Fig. 14]
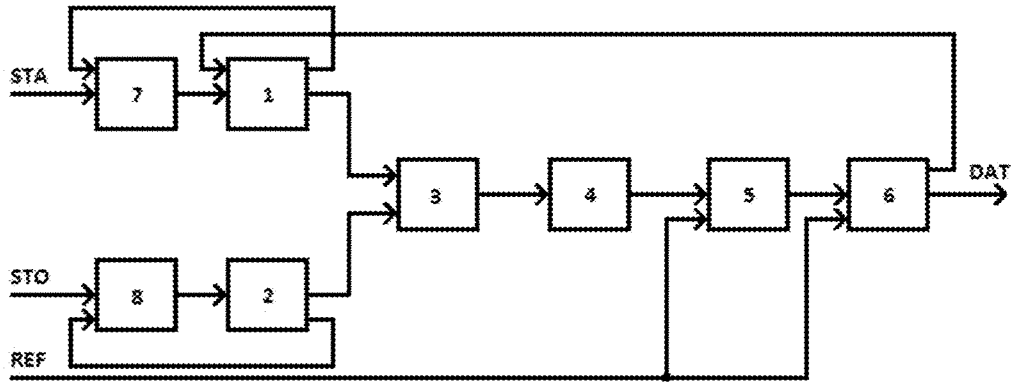
[Fig. 15]
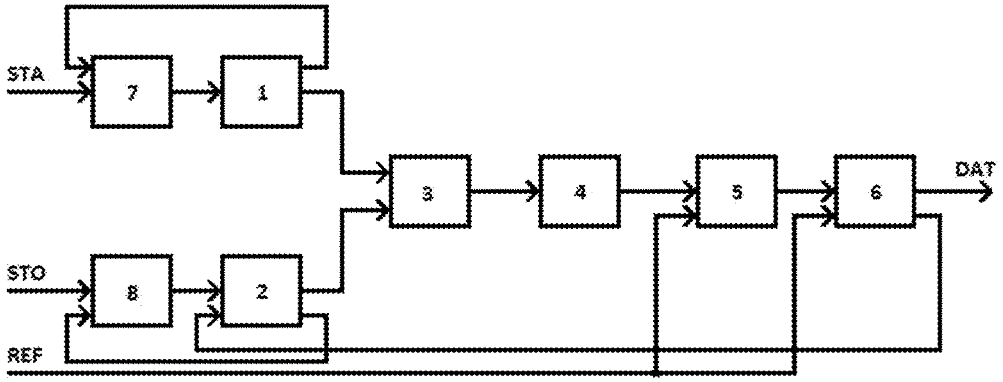

[Fig. 16]
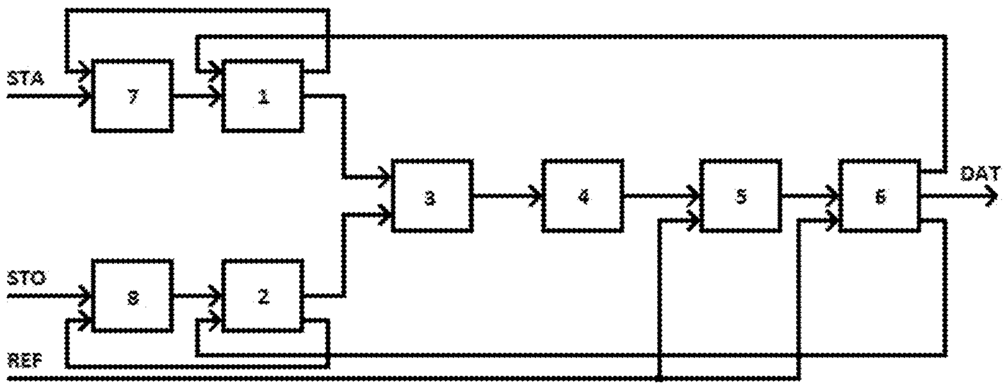
[Fig. 17]
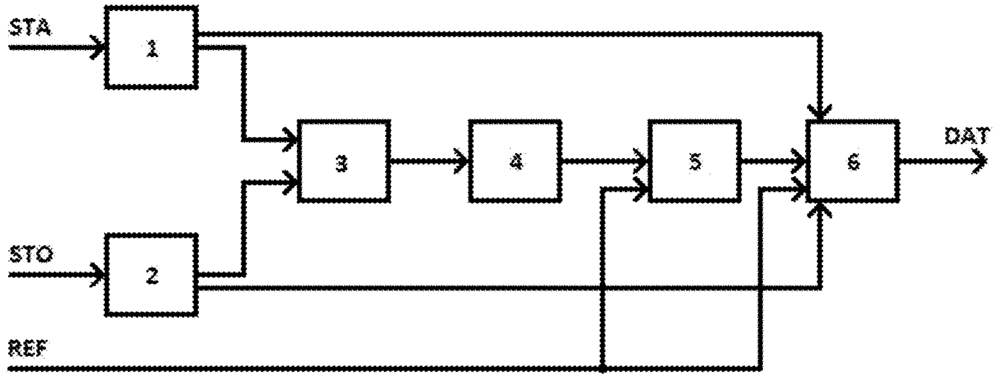
[Fig. 18]
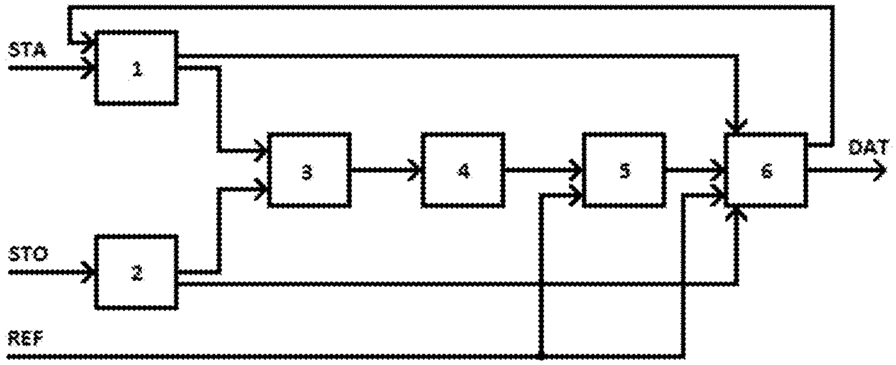

[Fig. 19]
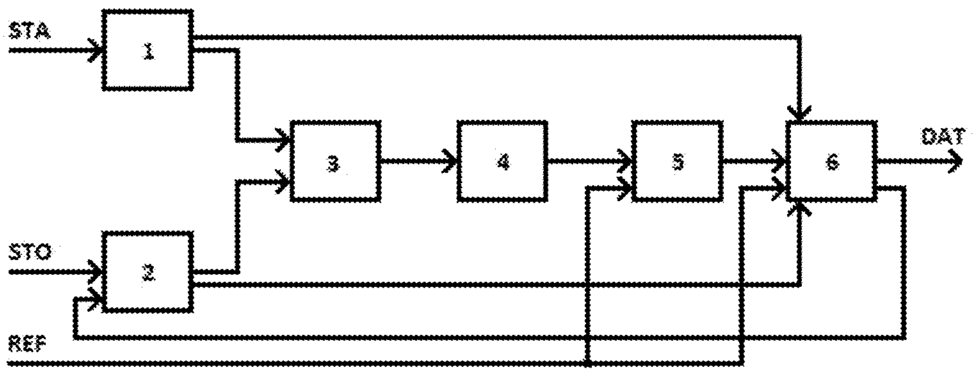
[Fig. 20]
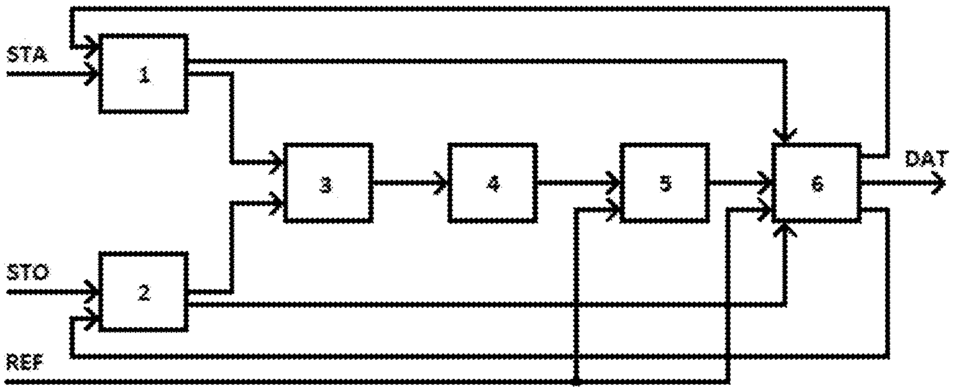
[Fig. 21]
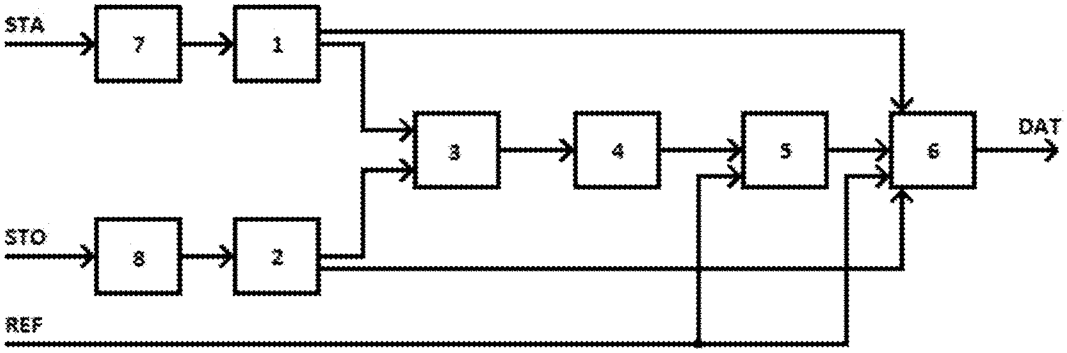

[Fig. 22]
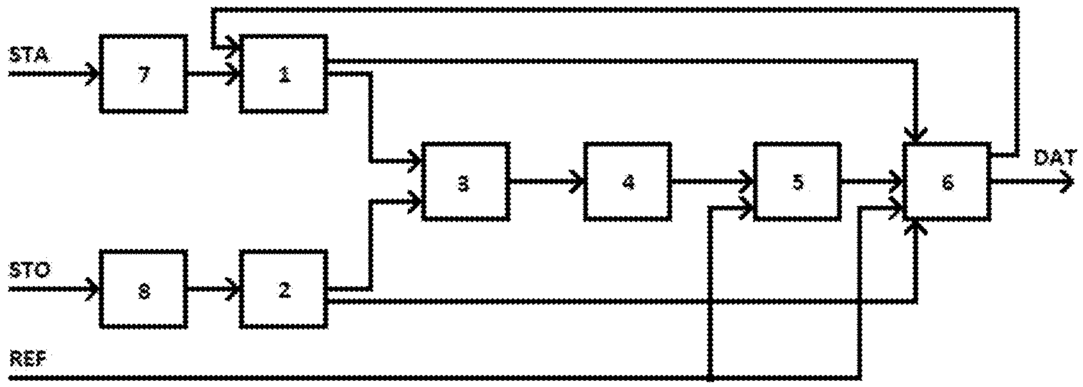
[Fig. 23]
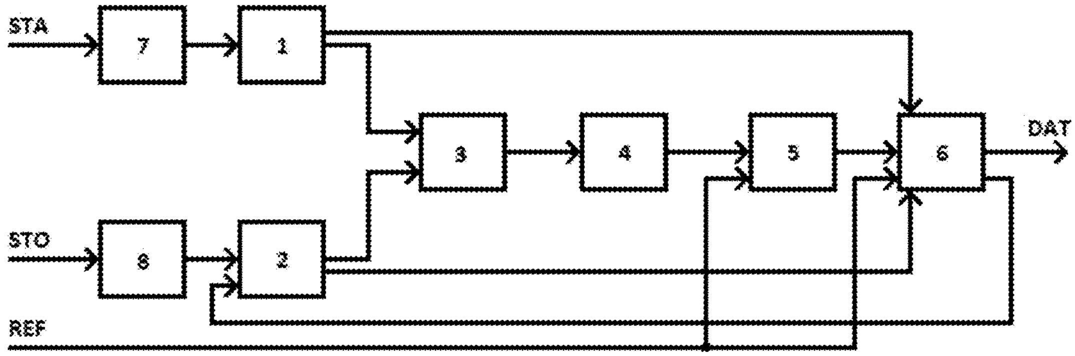
[Fig. 24]
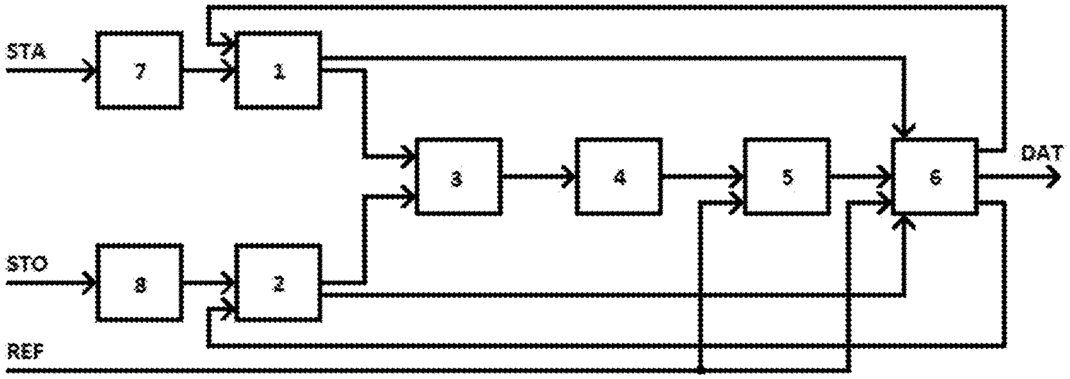

[Fig. 25]
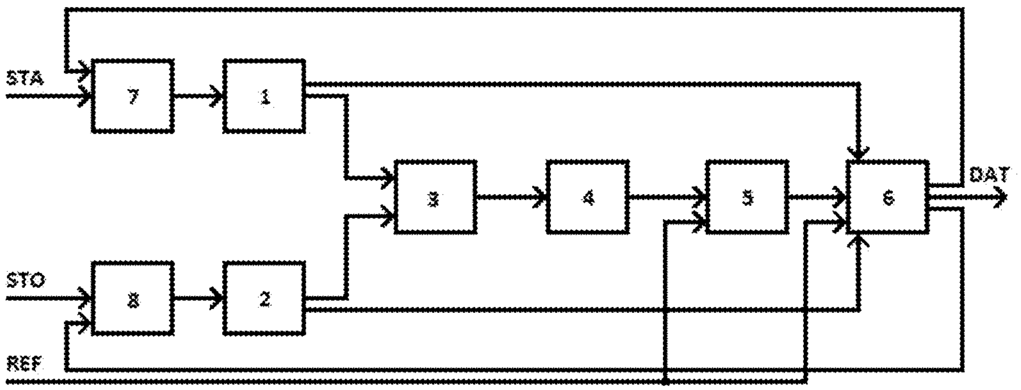
[Fig. 26]
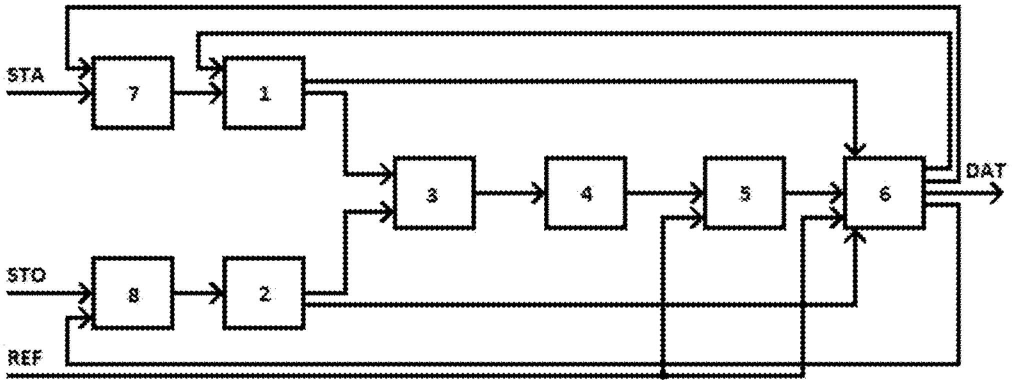
[Fig. 27]
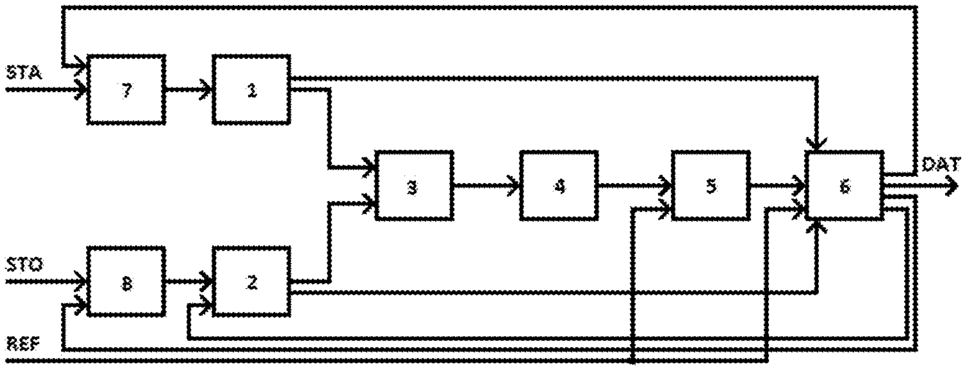

[Fig. 28]
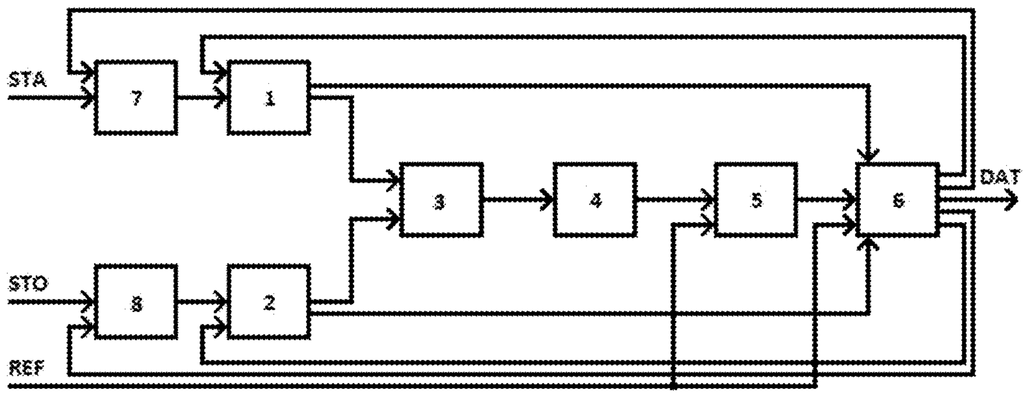
[Fig. 29]
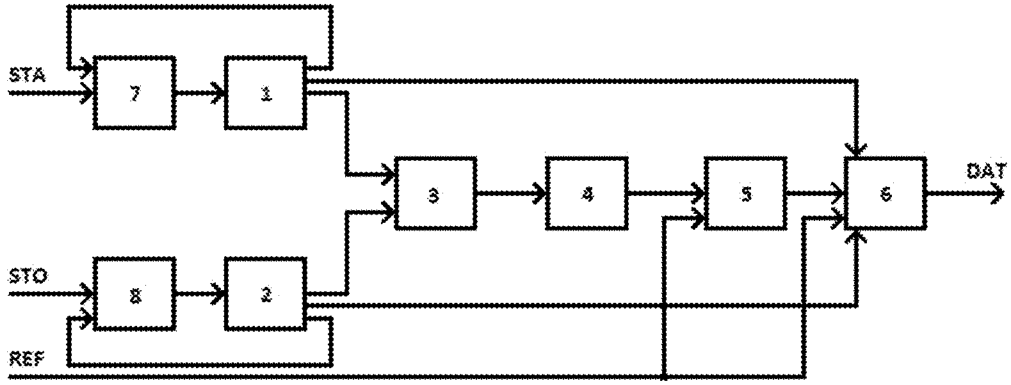
[Fig. 30]
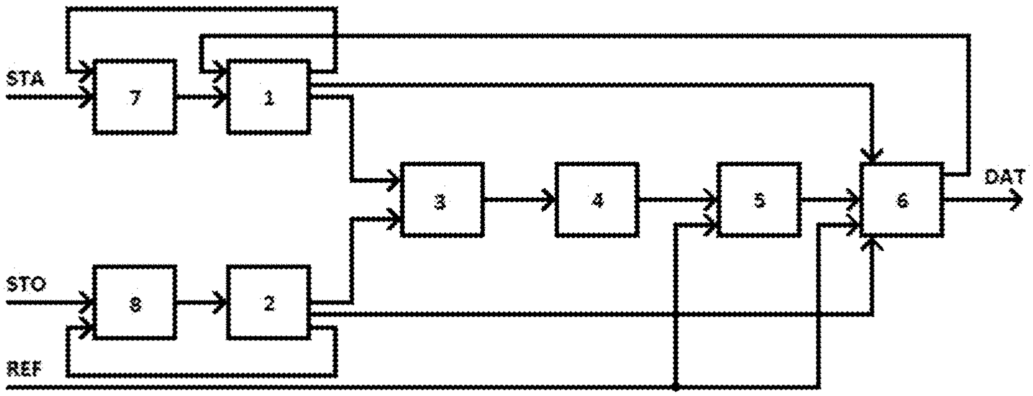

[Fig. 31]
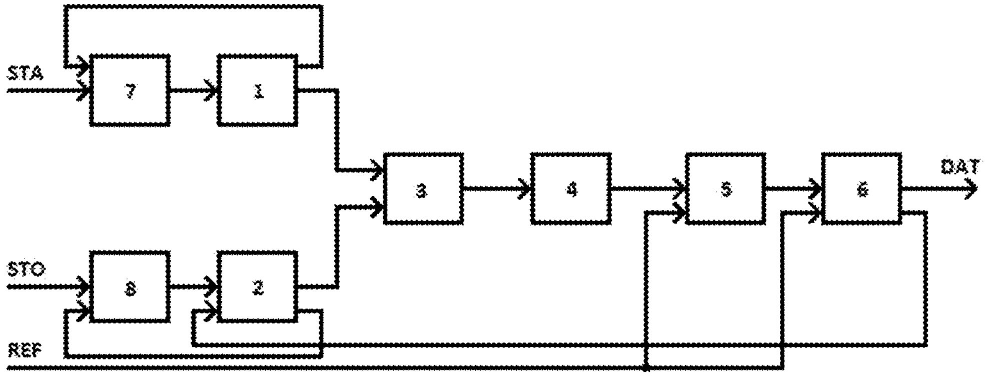
[Fig. 32]
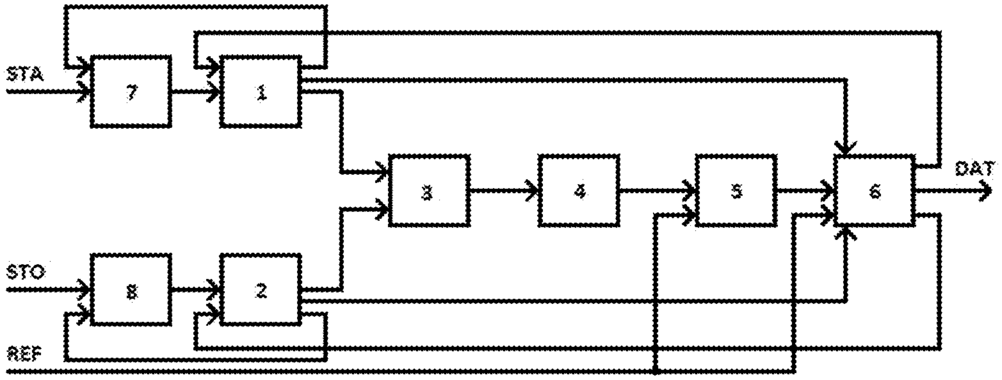
[Fig. 33]
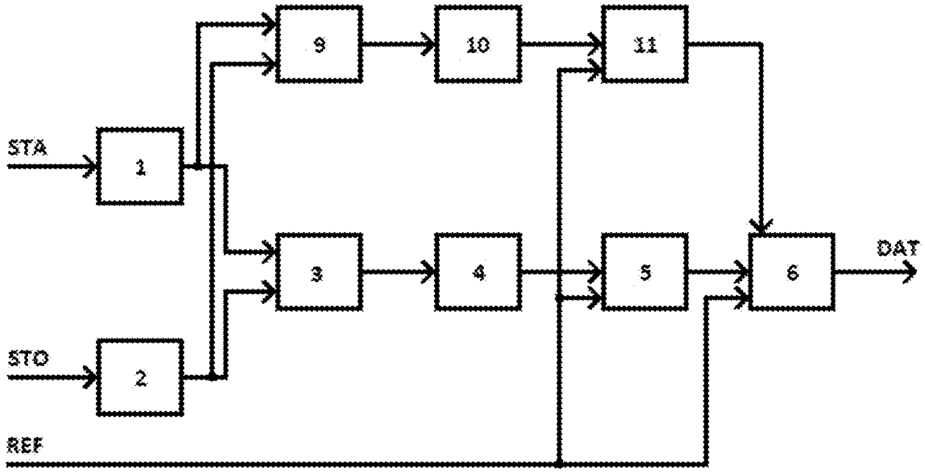

DEVICE FOR ACCURATE MEASUREMENT OF TIME INTERVALS

TECHNICAL FIELD

The invention relates to a device for accurate measurement of time intervals.

BACKGROUND ART

Accurate measurement of time intervals is used in many fields.

The most common device for accurately measuring time intervals is the digital delay line, described for example in U.S. Pat. No. 9,746,832. The principle is the excitation of a digital circuit, consisting of a series of many identical elements with a known delay and also connected to capacitors, by a start signal, their subsequent stop by a stop signal and summing the elements in the series that were excited. Gradual charging of capacitors in series allows more accurate measurements. Delay lines generally have low temperature stability. Due to the fact that it contains a large series of capacitors, each with differences in parameters, said device is limited in its accuracy.

Document US 2018317184 describes a method of synchronizing two remote time references based on mixing a constant frequency signal transmitted by them to produce a difference frequency from which a phase shift, i.e. time shift of both signals, results. This method does not allow measuring the delay between individual pulse signals, it only measures the phase difference of two signals of constant frequency.

U.S. Pat. No. 5,524,281 discloses a vector analyser that measures phase shift. The phase difference is determined on the principle of mixing an internally generated signal with the same signal passing through the circuit under investigation. Said device also does not allow the measurement of individual pulse signals.

Currently, the most accurate device for measuring time intervals is a device according to document CZ 294292 B6, which measures the time interval between events represented by pulse signals. The principle of the device is the conversion of the time interval measurement into the measurement of a sequence of samples of responses of surface acoustic wave (SAW) filter excited at the beginning and at the end of the measured interval. The signals are introduced into the filter gradually, which requires a certain minimum time gap of the signals given by the response time of the filter in the order of tens of nanoseconds and thus makes it impossible to measure very short or negative intervals.

With the development of modern applications for measuring accurate time intervals, increasing accuracy and stability of measurement is required, and current methods have already reached their limits. It is necessary to look for new principles that are not affected, for example, by stability or even a minimal difference in the parameters of a larger number of components used.

SUMMARY OF INVENTION

Said drawbacks are eliminated by the device for accurate measurement of time intervals according to the present invention. In the basic connection, the device for accurate measurement of time intervals according to the invention comprises a first comparator, to the input of which a first signal is fed and the output of which is connected to the first of the inputs of the combiner. The output of the second comparator, to the input of which the second signal is fed, is connected to the second input of the combiner. The output from the combiner is connected to the input of an analogue filter, the output of which is connected to the input of an analogue-to-digital converter, the output of which is connected to the input of the control and signal processing circuit. A reference clock signal is further fed to the second input of the control and signal processing circuit, and this signal is also fed to the second input of the analogue-to-digital converter. The output of the control and signal processing circuit is the data output of time intervals.

In preferred embodiments, a feedback is fed from the second output of the control and signal processing circuit to another input of the first comparator and/or another feedback is fed from the third output of the control and signal processing circuit to another input of the second comparator. Most preferably, the control and signal processing circuit is realized by a programmable gate array.

Preferably, the input of the first signal to the first comparator is provided with a first signal blocking switch and the input of the second signal to the second comparator with a second signal blocking switch.

Even more preferably, the first signal blocking switch is connected to the fourth output of the control and signal processing circuit and the second signal blocking switch is connected to the fifth output of the control and signal processing circuit, or the first signal blocking switch is controlled by another output of the first comparator and the second signal blocking switch is controlled by another output of the second comparator.

In another variant of the invention, a further output from the first comparator is fed to the third input of the control and signal processing circuit and a further output from the second comparator is fed to the fourth input of the control and signal processing circuit.

In another variant based on the basic connection of a device for accurate time interval measurement, the output from the first comparator is simultaneously connected to the first input of the second combiner and the output of the second comparator is simultaneously connected to the second input of the second combiner, wherein the output from the second combiner is connected to the input of the second analogue filter, the output of which is connected to the input of the second analogue-to-digital converter, the output of which is connected to the third input of the control and signal processing circuit.

The second combiner is preferably realized by three resistors connected in star and the second analogue filter is realized by a resistor and a capacitor connected in parallel. The combiner is preferably realized by three resistors connected in star. The analogue filter is preferably realized by a resistor and a capacitor connected in parallel.

Accurate measurement of time intervals by the device according to the invention consists in determining the time delay between a pair of pulse signals, a first signal and a second signal, by recording the analogue filter responses on the first comparator and second comparator started by them by an analogue-to-digital converter. In contrast to the device of the state of the art, the device according to the invention makes it possible to measure any time delay between signals, including short and negative, using only one analogue filter. By using only one analogue filter for both signals, almost zero difference of filter parameters or response course for both signals is achieved. The only remaining change of filter parameters is caused by their change in the time between the arrival of both signals; thus, in the case of measuring very short time intervals, this change is incomparably smaller than in any other known solution.

After measuring the response to both signals, the first signal and the second signal, using the analogue filter and the analogue-to-digital converter, the response is stored and compared with the stored recorded analogue filter response to only one separate signal, the first signal or the second signal. The pulse to excite this separate response is preferably realized by starting the first comparator or the second comparator by means of feedback from the control and signal processing circuit after the analogue filter response to the first signal and the second signal has subsided. In another variant, after the first signal and the second signal and the response to one separate signal have subsided, it is possible to trigger the second of the comparators by means of further feedback, thus enabling a separate response to be recorded also for the second of the signals.

After all these responses have been recorded, the time shifts between the analogue filter response to both signals and the two copies of the stored separate response are first determined using a series of correlations. These series of correlations always result in a time shift of the signal in question, the first signal or the second signal, contained in the response to both signals against the stored separate response, which represents a fixed point in time for both signals. Then, the time delay between the signals, the first signal and the second signal, can be easily calculated by the difference of the detected time shifts of the two signals against this separate response.

By using a sufficiently fast analogue-to-digital converter and a programmable gate array for the control and signal processing circuit, the accuracy of determining the time delay between a pair of signals in the order of picoseconds or less, unprecedentedly low stability value in the order of tens of femtoseconds and less and repetition frequency in the order of tens of kilohertz and more can be achieved.

Such high accuracy, and thanks to the use of only one analogue filter, the stability of time interval measurements is still very difficult to achieve, if not impossible, even when using the best scientific equipment for measuring time intervals. By combining both signals and their joint passing through only one series of electronic components, and by joint measurement using one analogue-to-digital converter, the value of accuracy and especially stability can be significantly lowered by several orders, which is not possible with any known solution.

BRIEF DESCRIPTION OF DRAWINGS

FIG. 1 represent a block diagram of the device according to the invention in different variants of exemplary embodiments—example 1, FIG. 2 represent a block diagram of the device according to the invention in different variants of exemplary embodiments—example 2, FIG. 3 represent a block diagram of the device according to the invention in different variants of exemplary embodiments—example 3, FIG. 4 represent a block diagram of the device according to the invention in different variants of exemplary embodiments—example 4, FIG. 5 represent a block diagram of the device according to the invention in different variants of exemplary embodiments—example 5, FIG. 6 represent a block diagram of the device according to the invention in different variants of exemplary embodiments—example 6, FIG. 7 represent a block diagram of the device according to the invention in different variants of exemplary embodiments—example 7, FIG. 8 represent a block diagram of the device according to the invention in different variants of exemplary embodiments—example 8, FIG. 9 represent a block diagram of the device according to the invention in different variants of exemplary embodiments—example 9, FIG. 10 represent a block diagram of the device according to the invention in different variants of exemplary embodiments—example 9, FIG. 11 represent a block diagram of the device according to the invention in different variants of exemplary embodiments—example 9, FIG. 12 represent a block diagram of the device according to the invention in different variants of exemplary embodiments—example 9, FIG. 13 represent a block diagram of the device according to the invention in different variants of exemplary embodiments—example 10, FIG. 14 represent a block diagram of the device according to the invention in different variants of exemplary embodiments—example 10, FIG. 15 represent a block diagram of the device according to the invention in different variants of exemplary embodiments—example 10, FIG. 16 represent a block diagram of the device according to the invention in different variants of exemplary embodiments—example 10, FIG. 17 represent a block diagram of the device according to the invention in different variants of exemplary embodiments—example 11, FIG. 18 represent a block diagram of the device according to the invention in different variants of exemplary embodiments—example 11, FIG. 19 represent a block diagram of the device according to the invention in different variants of exemplary embodiments—example 11, FIG. 20 represent a block diagram of the device according to the invention in different variants of exemplary embodiments—example 11, FIG. 21 represent a block diagram of the device according to the invention in different variants of exemplary embodiments—example 11, FIG. 22 represent a block diagram of the device according to the invention in different variants of exemplary embodiments—example 11, FIG. 23 represent a block diagram of the device according to the invention in different variants of exemplary embodiments—example 11, FIG. 24 represent a block diagram of the device according to the invention in different variants of exemplary embodiments—example 11, FIG. 25 represent a block diagram of the device according to the invention in different variants of exemplary embodiments—example 11, FIG. 26 represent a block diagram of the device according to the invention in different variants of exemplary embodiments—example 11, FIG. 27 represent a block diagram of the device according to the invention in different variants of exemplary embodiments—example 11, FIG. 28 represent a block diagram of the device according to the invention in different variants of exemplary embodiments—example 11, FIG. 29 represent a block diagram of the device according to the invention in different variants of exemplary embodiments—example 11, FIG. 30 represent a block diagram of the device according to the invention in different variants of exemplary embodiments—example 11, FIG. 31 represent a block diagram of the device according to the invention in different variants of exemplary embodiments—example 11, FIG. 32 represent a block diagram of the device according to the invention in different variants of exemplary embodiments—example 11, FIG. 33 represent a block diagram of the device according to the invention in different variants of exemplary embodiments—example 12,

EXAMPLES

Example 1

A basic variant of the device for accurate measurement of time intervals according to the invention is shown in FIG. 1. This device comprises a first comparator 1, to the input of which a first STA signal is fed and the output of which is connected to the first of the inputs of the combiner 3. The output of the second comparator 2, to the input of which the second signal STO is fed, is connected to the second input of the combiner 3. The output from the combiner 3 is connected to the input of an analogue filter 4, the output of which is connected to the input of an analogue-to-digital converter 5, the output of which is connected to the input of the control and signal processing circuit 6. A reference clock signal REF is further fed to the second input of the control and signal processing circuit 6, and this signal is also fed to the second input of the analogue-to-digital converter 5. The output of the control and signal processing circuit 6 is the data output DAT of time intervals.

In this variant of the device, the response of the analogue filter 4 to both combined signals, the first signal STA and the second signal STO, is first measured using the analogue-to-digital converter 5. The combiner 3 can be realized, for example, by means of a simple resistive signal combiner, i.e. by one resistor at each input and one at the output of the combiner 3 arranged in star, each having a resistance value equal to one third of the characteristic impedance of the line. After measuring the response to both signals, the response is stored and compared with the stored recorded response of the analogue filter 4 to only one of the signals, the first signal STA or the second signal STO. After said responses have been recorded, the time shifts between the analogue filter 4 response to both signals and the two copies of the stored separate response are first determined using a series of correlations. These correlations always result in a time shift of the signal in question, the first signal STA or the second signal STO, contained in the response to both signals against the stored separate response, which represents a fixed point in time for both signals. Then, the time delay between the signals, the first signal STA and the second signal STO, can be easily calculated by the difference of the detected time shifts of the two signals against this stored separate response.

The analogue filter 4 can be realized in the case of an AC line, for example by means of a capacitor connected in parallel and operating simultaneously with a non-zero line impedance as a low pass filter, and a parallel resistor, which will ensure discharging of said parallel-connected capacitor and thus limit the voltage response of the whole circuit in time.

Example 2

Another variant of the device according to the invention is based on the basic variant of the device described in Example 1 and is shown in FIG. 2. In this case, feedback is fed from the second output of the control and signal processing circuit 6 to another input of the first comparator 1. The addition of the feedback allows the first comparator 1 to be restarted, which preferably takes place after the analogue filter 4 responses have subsided after the arrival of the signals, the first signal STA and the second signal STO. It is thus possible to record a separate response of the analogue filter 4 to the signal from the first comparator 1.

In this variant of the device, the response of the analogue filter 4 to both combined signals, the first signal STA and the second signal STO, is first measured using the analogue-to-digital converter 5. After measuring the response to both signals, the first signal STA and the second signal STO, the response is stored and compared with the stored recorded response of the analogue filter 4 to only the separate first signal STA. The pulse to excite this separate response is realized by starting the first comparator 1 by means of feedback from the control and signal processing circuit 6 after the response to the combined signals, the first signal STA and the second signal STO, has subsided. After all said responses have been recorded, the time shifts between the analogue filter 4 response to both signals, the first signal STA and the second signal STO, and the two copies of the separate response to the first signal STA using a series of correlations. These correlations always result in a time shift of the signal STA or STO contained in the response to both signals against the stored separate response, which represents a fixed point in time for both signals. Then, the time delay between the signals, the first signal STA and the second signal STO, can be easily calculated by the difference of the detected time shifts of the two signals against the stored separate response to the first signal STA.

By measuring all said responses with a sufficiently fast analogue-to-digital converter 5 and using a programmable gate array as control and signal processing circuit 6, the accuracy of determining the time delay between a pair of signals in the order of picoseconds or less, unprecedentedly low stability value in the order of tens of femtoseconds and less and repetition frequency in the order of tens of kilohertz and more can be achieved.

Example 3

Another variant of the device according to the invention is based on the basic variant of the device described in Example 1 and is shown in FIG. 3. In this case, another feedback is fed from the third output of the control and signal processing circuit 6 to another input of the second comparator 2. The addition of the feedback allows the second comparator 2 to be restarted, which preferably takes place after the analogue filter 4 response has subsided after the arrival of combined signals, the first signal STA and the second signal STO. It is thus possible to record a separate response of the analogue filter 4 to the signal from the second comparator 2.

In this variant of the device, the response of the analogue filter 4 to both combined signals, the first signal STA and the second signal STO, is first measured using the analogue-to-digital converter 5. After measuring the response to both signals, the response is stored and compared with the stored recorded response of the analogue filter 4 to only the separate second signal STO. The pulse to excite this separate response is realized by starting the second comparator 2 by means of feedback from the control and signal processing circuit 6 after the response to the first signal STA and the second signal STO has subsided. After all said responses have been recorded, the time shifts between the analogue filter 4 response to both signals and the two copies of the separate response to the second signal STO are first determined using a series of correlations. These correlations always result in a time shift of the signal in question, the first signal STA or the second signal STO, contained in the response to both signals against the stored separate response, which represents a fixed point in time for both signals. Then, the time delay between the first signal STA and the second signal STO can be easily calculated by the difference of the detected time shifts of the two signals against the stored separate response to the second signal STO.

Example 4

Another variant of the device according to the invention is based on the variant of the device described in Example 2 and is shown in FIG. 4. In this case, another feedback is fed from the third output of the control and signal processing circuit 6 to another input of the second comparator 2. The addition of both feedbacks allows the subsequent gradual restart of the first comparator 1 and the second comparator 2, which preferably takes place after the analogue filter 4 responses have subsided after the arrival of the signals, the first signal STA and the second signal STO. It is thus possible to record separate responses of the analogue filter 4 to the signal from the first comparator 1 and the second comparator 2. Another advantage is that the variant allows the first comparator 1 and the second comparator 2 to be started at the same time, which makes it possible to measure the differences in lengths of connection between the output of the first comparator 1, or the second comparator 2, and the input of the analogue filter 4, and thus to calibrate the device.

In this variant of the device, the response of the analogue filter 4 to both combined signals, the first signal STA and the second signal STO, is first measured using the analogue-to-digital converter 5. After measuring the response to both signals, the response is stored and compared with the stored recorded response of the analogue filter 4 to only one of the signals, the first signal STA or the second signal STO. The pulse to excite this separate response is realized by starting the first comparator 1 or the second comparator 2 by means of feedbacks from the control and signal processing circuit 6 after the response to the signals, the first signal STA and the second signal STO, has subsided. After all said responses have been recorded, the time shifts between the analogue filter 4 response to both signals and the two copies of one separate response or both separate responses are first determined using a series of correlations. These correlations always result in a time shift of the signal in question, the first signal STA or the second signal STO, contained in the response to both signals against the stored separate response to the first signal STA or the second signal STO, which represents a fixed point in time for both signals. Then, the time delay between the signals, the first signal STA and the second signal STO, can be easily calculated by the difference of the detected time shifts of the two signals against the stored separate response.

The use of a pair of feedbacks, i.e. to the first comparator 1 and the second comparator 2, makes it possible, by means of their simultaneous starting, to simulate the arrival of both signals, the first signal STA and the second signal STO at the same time, i.e. with a zero mutual time shift. After calculating the time delay between these signals using a series of correlations, it is used as a calibration constant having the value of the difference between the propagation times of the signals, the first signal STA and the second signal STO, until they enter the analogue filter 4. The calibration constant can also be measured repeatedly, which further refines its value.

Example 5

Another variant of the device according to the invention is based on the basic variant of the device described in Example 1 and is shown in FIG. 5. In this case, in addition, the input of the first signal STA to the first comparator 1 is provided with a first signal blocking switch 7 and the input of the second signal STO to the second comparator 2 is provided with a second signal blocking switch 8. The addition of the first signal blocking switch 7 and the second signal blocking switch 8 makes it possible to isolate the inputs of the first comparator 1 and the second comparator 2 and thus ensure that the signals remain unchanged at their outputs for the time necessary to measure the analogue filter 4 responses using the analogue-to-digital converter 5. Said unchangeability of signals is important to achieve unchangeability of the response of the analogue filter 4 in any repeated start of the first comparator 1 or the second comparator 2.

Example 6

Another variant of the device according to the invention is based on the variant of the device described in Example 2 and is shown in FIG. 6. In this case, in addition, the input of the first signal STA to the first comparator 1 is provided with a first signal blocking switch 7 and the input of the second signal STO to the second comparator 2 is provided with a second signal blocking switch 8. This variant combines the advantages of the feedback as given in Example 2 and the two switches mentioned in Example 5.

Example 7

Another variant of the device according to the invention is based on the variant of the device described in Example 3 and is shown in FIG. 7. In this case, in addition, the input of the first signal STA to the first comparator 1 is provided with a first signal blocking switch 7 and the input of the second signal STO to the second comparator 2 is provided with a second signal blocking switch 8. This variant combines the advantages of the feedback as given in Example 3 and the two switches mentioned in Example 5.

Example 8

Another variant of the device according to the invention is based on the variant of the device described in Example 4 and is shown in FIG. 8. In this case, in addition, the input of the first signal STA to the first comparator 1 is provided with a first signal blocking switch 7 and the input of the second signal STO to the second comparator 2 is provided with a second signal blocking switch 8. This variant combines the advantages of two feedbacks as given in Example 4 and the two switches mentioned in Example 5.

Example 9

Other possible variants of the device according to the invention are based on the device variants described in Examples 5 to 8 and are shown in FIGS. 9, 10, 11 and 12. In addition, as can be seen from the figures, in said device variants, the first signal blocking switch 7 is connected to the fourth output of the control and signal processing circuit 6 and the second signal blocking switch 8 is connected to the fifth output of the control and signal processing circuit 6. This variant combines the advantages of the feedbacks as given in Examples 2, 3 and 4 and the two switches mentioned in Example 5, which can additionally be controlled by means of the control and signal processing circuit 6.

Example 10

Other possible variants of the device according to the invention are based on the device variants described in Examples 5 to 8 and are shown in FIGS. 13, 14, 15 and 16. In addition, as can be seen from the figures, in said device variants, the first signal blocking switch 7 is controlled by a further output of the first comparator 1 and the second signal blocking switch 8 is controlled by a further output of the second comparator 2. This variant combines the advantages of the feedbacks as given in Examples 2, 3 and 4 and the two switches mentioned in Example 5, which are controlled directly by the outputs from the first comparator 1 and the second comparator 2.

Example 11

Other possible variants of the device according to the invention are based on the device variants described in Examples 1 to 9 and are shown in FIGS. 17 to 32. In addition, as can be seen from the figures, in said device variants a further output from the first comparator 1 is fed to the third input of the control and signal processing circuit 6 and a further output from the second comparator 2 is fed to the fourth input of the control and signal processing circuit 6. This variant combines all the advantages mentioned in the previous examples except for example 10. The connection of the further output of the first comparator 1 and the further output of the second comparator 2 to the control and signal processing circuit 6 makes it possible to record the gross start time of the first comparator 1 and the second comparator 2 and the arrivals of signals, the first signal STA and the second signal STO, respectively; thereby facilitating and accelerating the detection of the start of the analogue filter 4 in response to the start of the first comparator 1 and the second comparator 2.

Example 12

Another possible variant of the device according to the invention is based on the variant of the device described in Example 1 and is shown in FIG. 33. As can be seen from the figure, in said device variant a first input of the second combiner 9 is further connected to the output of the first comparator 1 and a second input of the second combiner 9 is further connected to the output of the second comparator 2, the output of which is connected to the input of a second analogue filter 10, the output of which is connected to the input of a second analogue-to-digital converter 11, the output of which is connected to the third input of the control and signal processing circuit 6. This variant makes it possible to record the responses of the analogue filter 4 and at the same time the second analogue filter 10 for each of the signals, the first signal STA and the second signal STO.

Doubling the responses to both signals, the first signal STA and the second signal STO, and their passing through the analogue filter 4 and the second analogue filter 10 allows the courses to be measured for the signals, the first signal STA and the second signal STO, by means of both the analogue-to-digital converter 5 and the second analogue-to-digital converter 11. After said responses of the analogue filter 4 and the second analogue filter 10 have subsided, the courses are stored using the control and signal processing circuit 6. Advantageously, the different propagation times of the first signal STA between the first comparator 1 and the analogue filter 4 and the second analogue filter 10 and/or different propagation times of the second signal STO between the second comparator 2 and the analogue filter 4 and the second analogue filter 10, i.e. the mutual phase shift of the responses of the analogue filter 4 and the second analogue filter 10 to both signals, the first signal STA and the second signal STO, can then be used and decomposed into their individual components by means of statistical decomposition of the signals, thus calculate both a separate response to the first signal STA and a separate response to the second signal STO. The calculated separate response to the first signal STA and/or the calculated separate response to the second signal STO is then used together with one stored response to both signals in the same way as described in the previous examples for a series of correlations and subsequent calculation of the delay between the first signal STA and the second signal STO.

This variant of the device therefore does not require the starting of the first comparator 1 or the second comparator 2 by means of feedbacks to measure the response to a separate signal or separate signals, and this further refines the calculation and, above all, the stability of the time delay between the signals, however, at the cost of very high demands on the computational power required for the calculations of the statistical decomposition of the signals.

INDUSTRIAL APPLICABILITY

Accurate measurement of time intervals is used in many fields. The device according to the invention can be used in various fields such as nuclear technology, astronomy, medicine, electronics, metrology, navigation. Within the individual fields, the connections according to the invention can be used in various devices where it is necessary to measure the time delay between two events, such as radars, lidars, ultrasonic sonars, test devices for electronic circuits, TDC converters, various spatial aiming devices, rangefinders, equipment for medical diagnostics, devices for time metrology and devices for basic particle research.

The invention claimed is:

1. A device for accurate measurement of time intervals, characterized in that it comprises a first comparator (1) to the input of which a first signal (STA) is fed and output of which is connected to the first of the inputs of a combiner (3), to the second input of which the output of a second comparator (2) is connected, to the input of which a second signal (STO) is fed, wherein the output from the combiner (3) is connected to the input of an analogue filter (4), the output of which is connected to the input of an analogue-to-digital converter (5), the output of which is connected to the input of a control and signal processing circuit (6), to the second input of which a reference clock signal (REF) is further fed, which is simultaneously fed to another input of the analogue-to-digital converter (5) and the output of the control and signal processing circuit (6) is a data output (DAT) of time intervals.

2. The device for accurate measurement of time intervals according to claim 1, characterized in that a feedback is fed from the second output of the control and signal processing circuit (6) to a further input of the first comparator (1).

3. The device for accurate measurement of time intervals according to claim 1, characterized in that a further feedback is fed from the third output of the control and signal processing circuit (6) to a further input of the second comparator (2).

4. The device for accurate measurement of time intervals according to claim 1, characterized in that the control and signal processing circuit (6) is realized by a programmable gate array.

5. The device for accurate measurement of time intervals according to claim 1, characterized in that the input of the first signal (STA) to the first comparator (1) is provided with a first signal blocking switch (7) and the input of the second signal (STO) to the second comparator (2) is provided with a second signal blocking switch (8).

6. The device for accurate measurement of time intervals according to claim 5, characterized in that the first signal blocking switch (7) is connected to the fourth output of the control and signal processing circuit (6) and the second signal blocking switch (8) is connected to the fifth output of the control and signal processing circuit (6).

7. The device for accurate measurement of time intervals according to claim 5, characterized in that the first signal blocking switch (7) is controlled by a further output of the first comparator (1) and the second signal blocking switch (8) is controlled by a further output of the second comparator (2).

8. The device for accurate measurement of time intervals according to claim 1, characterized in that a further output from the first comparator (1) is fed to the third input of the control and signal processing circuit (6) and a further output from the second comparator (2) is fed to the fourth input of the control and signal processing circuit (6).

9. The device for accurate measurement of time intervals according to claim 1, characterized in that the output of the first comparator (1) is simultaneously connected to the first input of the second combiner (9) and the of output the second comparator (2) is simultaneously connected to the second input of the second combiner (9), wherein the output of the second combiner (9) is connected to the input of the second analogue filter (10), the output of which is connected to the input of a second analogue-to-digital converter (11), the output of which is connected to the third input of the control and signal processing circuit (6).

10. The device for accurate measurement of time intervals according to claim 9, characterized in that the second combiner (9) is realized by three resistors connected in star and the second analogue filter (10) is realized by a resistor and a capacitor connected in parallel.

11. The device for accurate measurement of time intervals according to claim 1, characterized in that the combiner (3) is realized by three resistors connected in star.

12. Device for accurate measurement of time intervals according to claim 1, characterized in that the analogue filter (4) is realized by a resistor and a capacitor connected in parallel.

* * * * *